US011126728B2

(12) United States Patent
Michishita

(10) Patent No.: US 11,126,728 B2
(45) Date of Patent: Sep. 21, 2021

(54) ELECTRONIC APPARATUS ENABLING OMISSION OF SOFTWARE TAMPERING DETECTION PROCESSING AT ACTIVATION

(71) Applicant: CANON KABUSHIKI KAISHA, Tokyo (JP)

(72) Inventor: Takumi Michishita, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/808,263

(22) Filed: Mar. 3, 2020

(65) Prior Publication Data

US 2020/0293664 A1 Sep. 17, 2020

(30) Foreign Application Priority Data

Mar. 11, 2019 (JP) .............................. JP2019-044282

(51) Int. Cl.
| | |
|---|---|
| *G06F 21/57* | (2013.01) |
| *G06F 21/56* | (2013.01) |
| *H04N 1/00* | (2006.01) |
| *G06F 9/4401* | (2018.01) |
| *G06F 21/60* | (2013.01) |
| *H04N 1/44* | (2006.01) |

(52) U.S. Cl.
CPC .......... *G06F 21/575* (2013.01); *G06F 9/4406* (2013.01); *G06F 21/566* (2013.01); *G06F 21/608* (2013.01); *H04N 1/00904* (2013.01); *H04N 1/4433* (2013.01)

(58) Field of Classification Search
CPC .. G06F 11/1417; G06F 21/566; G06F 21/575; G06F 21/608; G06F 21/74; G06F 21/81; G06F 21/86; G06F 9/4406; G06F 3/121; H04N 1/00904; H04N 1/4433; G06Q 20/3827
USPC ......................... 358/1.11–1.18, 1.6; 707/698
See application file for complete search history.

(56) References Cited

U.S. PATENT DOCUMENTS

| | | | | |
|---|---|---|---|---|
| 5,457,748 A | * | 10/1995 | Bergum ................... | G06F 21/86 380/270 |
| 8,464,037 B2 | * | 6/2013 | Grell ....................... | G06F 21/575 713/2 |
| 9,584,693 B2 | * | 2/2017 | Iizuka ...................... | G06F 21/64 |
| 10,118,421 B2 | * | 11/2018 | Teets ....................... | B41J 13/103 |
| 2005/0138409 A1 | * | 6/2005 | Sheriff ................... | G06F 21/575 726/26 |

(Continued)

FOREIGN PATENT DOCUMENTS

| | | |
|---|---|---|
| EP | 2624056 A2 | 8/2013 |
| EP | 2709032 A2 | 3/2014 |

(Continued)

*Primary Examiner* — Chad Dickerson
(74) *Attorney, Agent, or Firm* — Canon U.S.A., Inc. IP Division

(57) ABSTRACT

An electronic apparatus that is configured to detect tampering with predetermined software shifts to one of a power-off mode and a suspended mode based on a power-off instruction. The electronic apparatus performs detection of tampering with the predetermined software at activation of the electronic apparatus from the power-off mode and does not perform detection of tampering with the predetermined software at activation of the electronic apparatus from the suspended mode.

12 Claims, 11 Drawing Sheets

(56) References Cited

U.S. PATENT DOCUMENTS

2009/0316178 A1   12/2009  Tanaka
2015/0286846 A1*  10/2015  Prakash ............... G01R 22/066
                                                                     726/34

FOREIGN PATENT DOCUMENTS

JP        2008-244992 A    10/2008
JP        2013-149135 A     8/2013

* cited by examiner

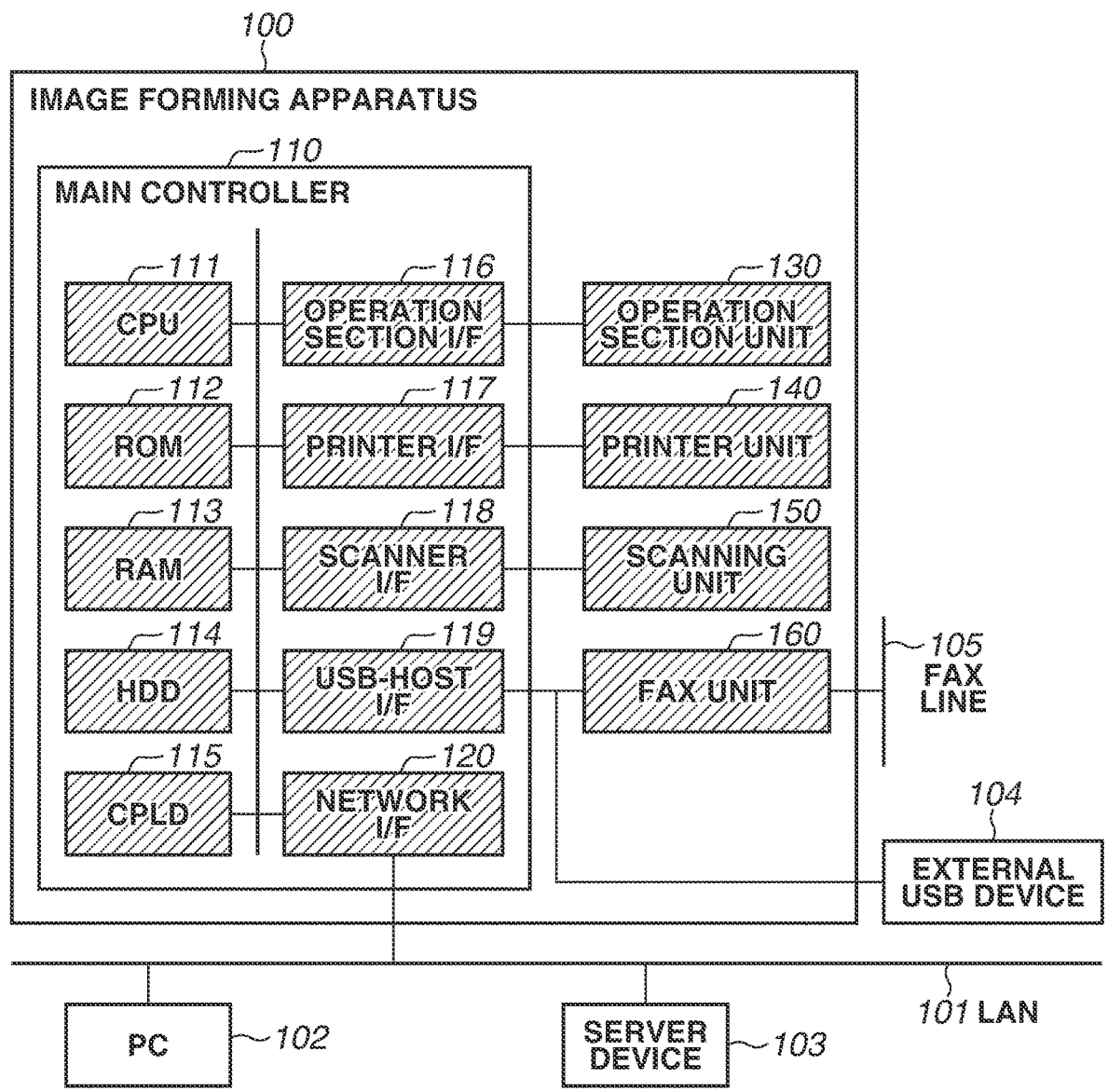

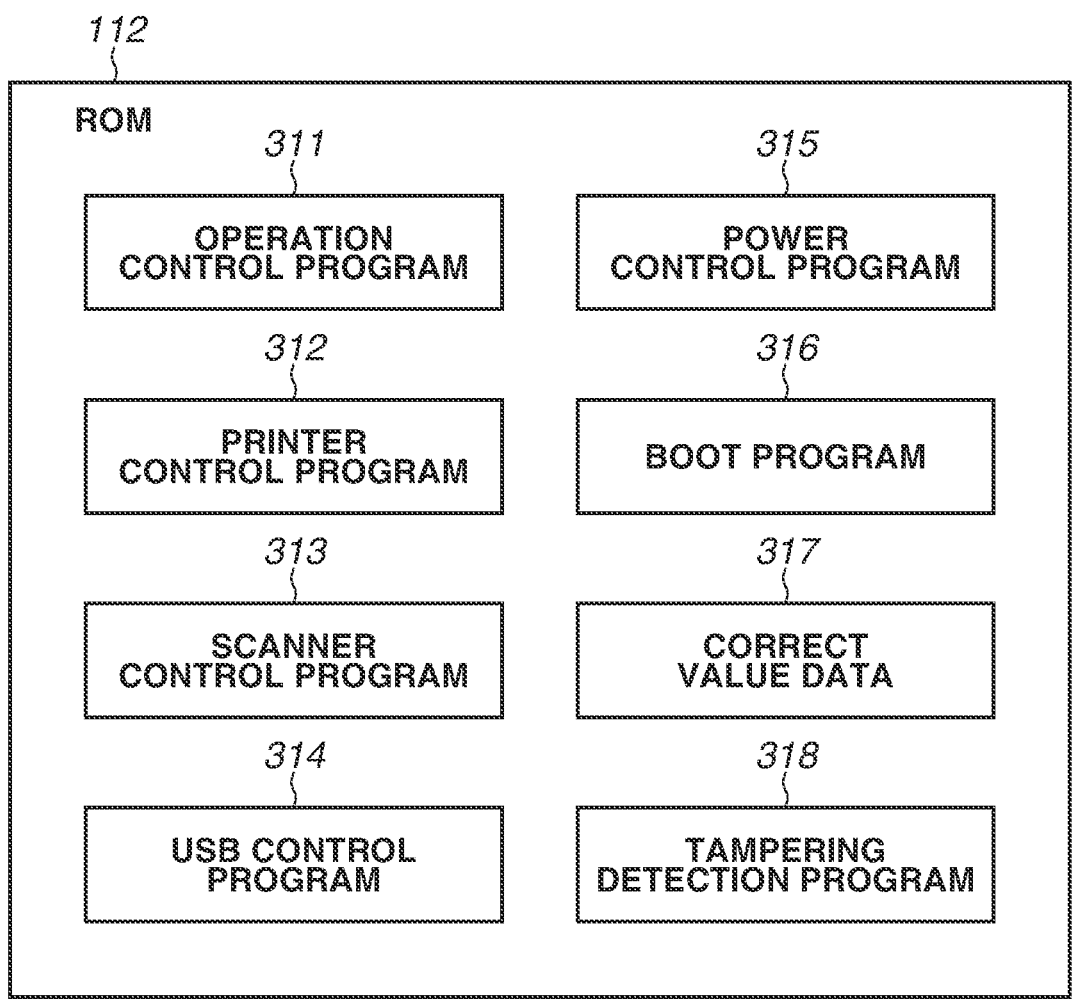

ELECTRONIC APPARATUS ENABLING OMISSION OF SOFTWARE TAMPERING DETECTION PROCESSING AT ACTIVATION

BACKGROUND OF THE INVENTION

Field of the Invention

The present invention relates to an electronic apparatus that enables omission of software tampering detection processing at activation.

Description of the Related Art

Attack on computers by exploiting vulnerability of software and tampering software becomes an issue. A technique, as discussed in, for example, Japanese Patent Application Laid-Open No. 2008-244992 and Japanese Patent Application Laid-Open No. 2013-149135, for software tampering detection at activation of an apparatus is known as a countermeasure against software tampering. Japanese Patent Application Laid-Open No. 2008-244992 discusses an apparatus that compares a hash value of a boot program with a prestored value at activation of the apparatus, and permits the activation if the hash value and the prestored value match each other. When software tampering detection is performed at activation, an activation time becomes longer than a normal activation time by a time for software tampering detection. Japanese Patent Application Laid-Open No. 2013-149135 discusses an apparatus that temporarily skips software tampering detection by an operation pressing a function key on a keyboard at activation.

In order to achieve environmental friendliness, for example, European standby power regulation (energy-related program Lot 6) requires that power consumption of a device is 0.5 W or less in a power off mode (only an alternating-current [AC] plug is connected) or in a standby mode (only an activating function is enabled). Therefore, for example, an apparatus having power consumption of 0.5 W or less in the advanced configuration and power interface (ACPI) S3 state and the ACPI S4 state is proposed to limit power consumption to 0.5 W or less and to shorten an activation time from a standby mode. The ACPI S3 state is a suspend-to-random access memory (RAM) (STR) mode, and the ACPI S4 state is a suspend-to-disk (STD) mode.

A user who desires to activate an apparatus in a short time causes the apparatus to shift not to the ACPI S5 (power off) state but to the ACPI S3 state or S4 state, when the apparatus is not being used. However, at activation from the ACPI S3 or S4 state, if software tampering detection processing is executed as discussed in Japanese Patent Application Laid-Open No. 2008-244992, the activation time becomes longer by a time taken for the software tampering detection processing. While, with Japanese Patent Application Laid-Open No. 2013-149135, the software tampering detection processing can be skipped by a temporary cancel operation (pressing a function key), the user has to perform the cancel operation every time when activating the apparatus.

SUMMARY OF THE INVENTION

Therefore, from an aspect of the above issue, the present invention is directed to omission of software tampering detection processing at activation from a standby mode without a predetermined user operation.

According to an aspect of the present invention, an electronic apparatus that is configured to communicate with an external device and to detect tampering with predetermined software, the electronic apparatus includes a shifting unit configured to cause the electronic apparatus to shift to one of a first off mode in which electric power supply to a predetermined device is stopped and communication with the external device is disabled and a second off mode in which electric power supply to the predetermined device is performed and communication with the external device is disabled, based on a power-off instruction, and a detection unit configured to perform detection of tampering with the predetermined software at activation of the electronic apparatus from the first off mode, wherein the detection unit does not perform detection of tampering with the predetermined software at activation of the electronic apparatus from the second off mode.

Further features of the present invention will become apparent from the following description of embodiments with reference to the attached drawings.

BRIEF DESCRIPTION OF THE DRAWINGS

FIG. 2C is a diagram illustrating the image forming apparatus in a power-off mode.

FIG. 3 is a diagram illustrating various programs to be stored in a read only memory (ROM).

FIG. 4 is a diagram illustrating a screen for setting whether to perform high-speed activation at a time when a main power supply is ON.

FIG. 7 is a flowchart illustrating processing procedure to be executed when the power switch is turned on.

FIG. 9 is a flowchart illustrating processing procedure to be executed when the power switch is turned on.

DESCRIPTION OF THE EMBODIMENTS

Embodiments of the present invention will be described with reference to the drawings. An image forming apparatus having a printing function and a scanning function is described as an example of an electronic apparatus. An image forming apparatus 100 can shift to a normal power mode, a sleep mode, a suspended mode (standby mode), and a power-off mode. The normal power mode corresponds to the advanced configuration and power interface (ACPI) S0 state, the sleep mode and the suspended mode correspond to the ACPI S3 state, and the power-off mode corresponds to the ACPI S5 state. The image forming apparatus 100 can shift also to a hibernation mode that corresponds to the ACPI S4 state.

Figure 1:
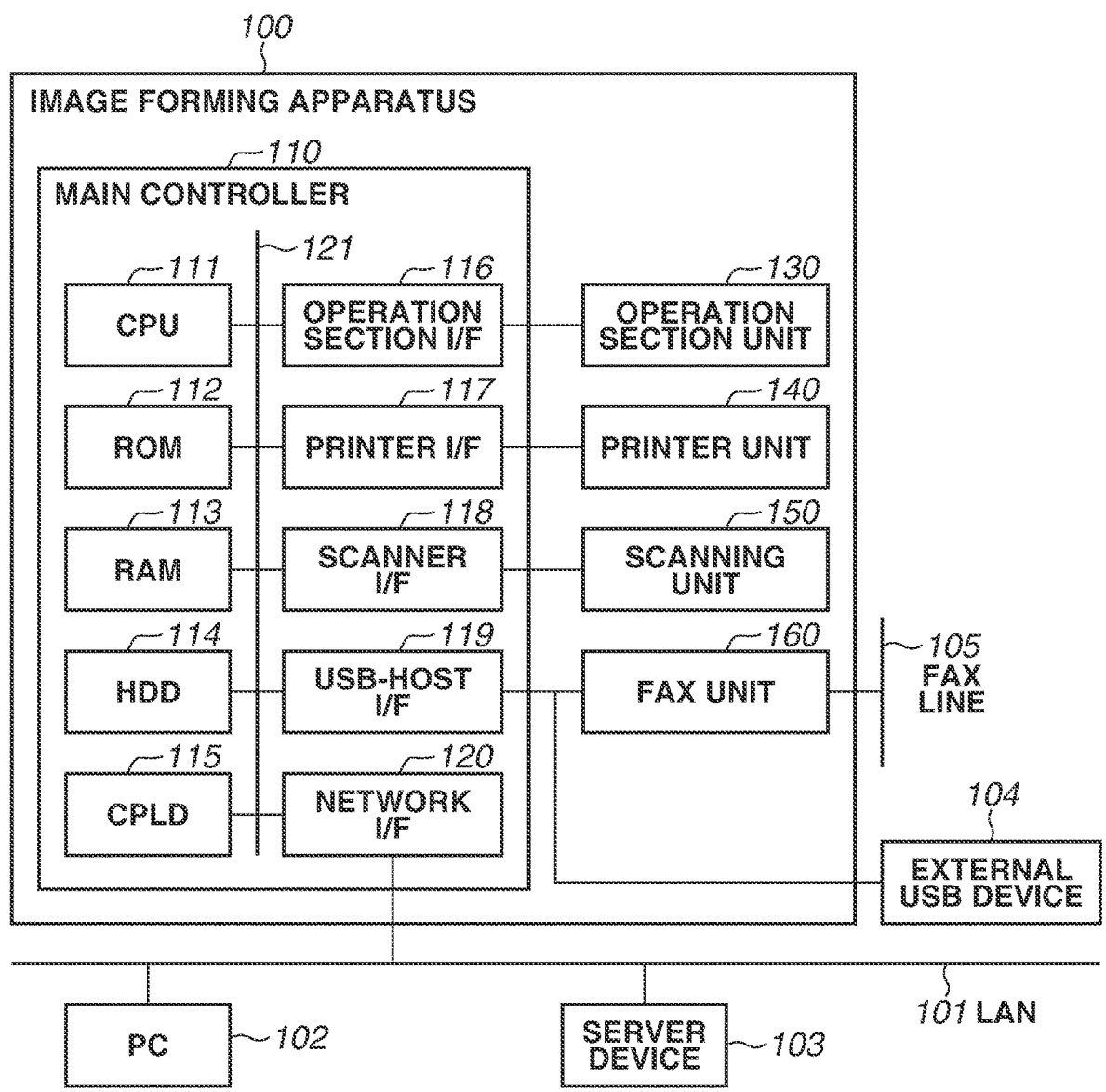
FIG. 1 is a hardware block diagram illustrating a configuration of an image forming apparatus 100.

FIG. 1 is a hardware block diagram illustrating a configuration of the image forming apparatus 100 according to a first embodiment. The image forming apparatus 100 includes a main controller 110, an operation section unit 130, a printer unit 140, a scanning unit 150, and a facsimile (FAX) unit 160. The main controller 110 controls the respective units (the operation section unit 130, the printer unit 140, the scanning unit 150, and the FAX unit 160) of the image forming apparatus 100. The main controller 110 includes a central processing unit (CPU) 111, a read only memory (ROM) 112, and a random access memory (RAM) 113. The main controller 110 further includes a hard disk drive (HDD) 114 and a complex programmable logic device (CPLD) 115. The main controller 110 further includes an operation section interface (I/F) 116, a printer I/F 117, a scanner I/F 118, a universal serial bus (USB)-Host I/F 119, and a network I/F 120.

The operation section I/F 116 is connected with the operation section unit 130. The operation section I/F 116 transmits an instruction input in the operation section unit 130 by a user to the CPU 111. The operation section unit 130 includes a display unit that displays information, and an input unit that receives an input from a user. Examples of the input unit include a keyboard, hardware keys, and touch sensors. The operation section I/F 116 receives display data displayed on the display unit of the operation section unit 130 from the CPU 111, and transmits the display data to the operation section unit 130. The printer I/F 117 is connected with a printer unit (printing unit) 140. The printer I/F 117 transmits image data to the printer unit 140. The printer unit 140 performs printing based on the received image data. The scanner I/F 118 is connected with the scanning unit (reading unit) 150. The scanning unit 150 reads an image on a document using a line sensor configured by a charge coupled device (CCD), and generates image data. The scanning unit 150 transmits the generated image data to the scanner I/F 118. The scanner I/F 118 stores the image data in the HDD 114.

The USB-Host I/F 119 communicates with a USB device connected with the USB-Host I/F 119. The USB-Host I/F 119 is connected with a USB cable. The USB-Host I/F 119 may be connected directly with the USB device. The USB-Host I/F 119 according to the present embodiment is an interface that connects the main controller 110 and the FAX unit 160. The FAX unit 160 transmits FAX data to a FAX line 105 based on the image data transmitted via the USB-Host I/F 119. The FAX unit 160 also generates image data based on the FAX data received from the FAX line 105, and transmits the image data to the HDD 114 via the USB-Host I/F 119. The image data stored in the HDD 114 is printed on a recording medium by the printer unit 140. The USB-Host I/F 119 is connectable also with an external USB device 104. The external USB device 104 is, for example, a USB memory or a USB keyboard. An updating file to be used for updating can be transmitted to the USB memory.

The network I/F 120 communicates with other devices (for example, a personal computer [PC] 102) on a network connected with the network I/F 120. The network I/F 120 is connected with a network cable (for example, a local area network [LAN] cable). The network I/F 120 communicates with the PC 102 and a server device 103 via a LAN 101. The PC 102 can transmit print data, operate the image forming apparatus 100 via a web browser, and transmit a firmware file.

The CPLD 115 functions as a power control unit that controls supplying and stopping power to the respective units of the image forming apparatus 100. The CPU 111 can cause the image forming apparatus 100 to shift to the normal power mode (ACPI-S0), the sleep mode (ACPI-S3), the suspended mode (ACPI-S3), and the power-off mode (ACPI-S5).

Figure 2A:
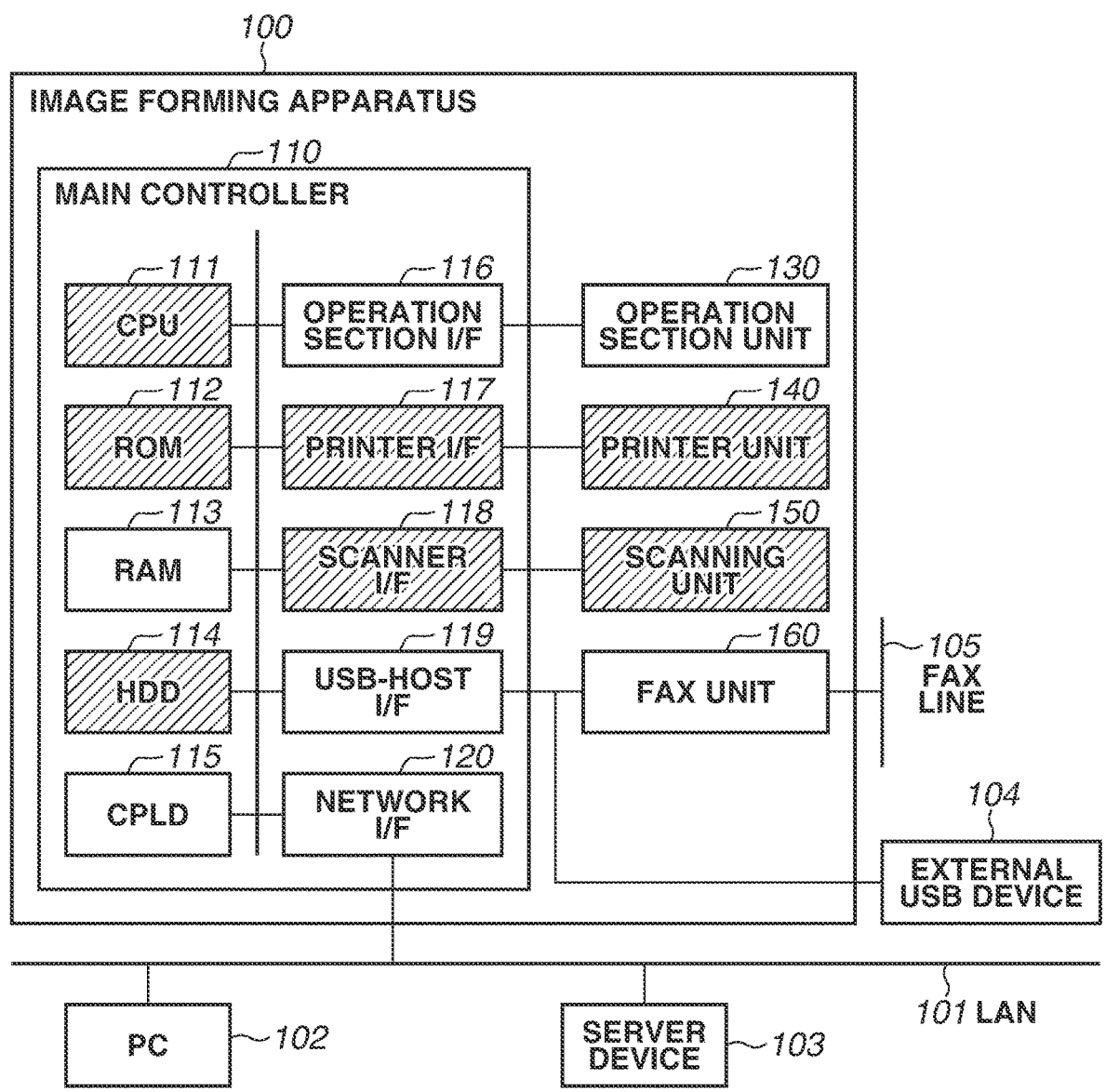
FIG. 2A is a diagram illustrating the image forming apparatus in a sleep mode.
Figure 2B:
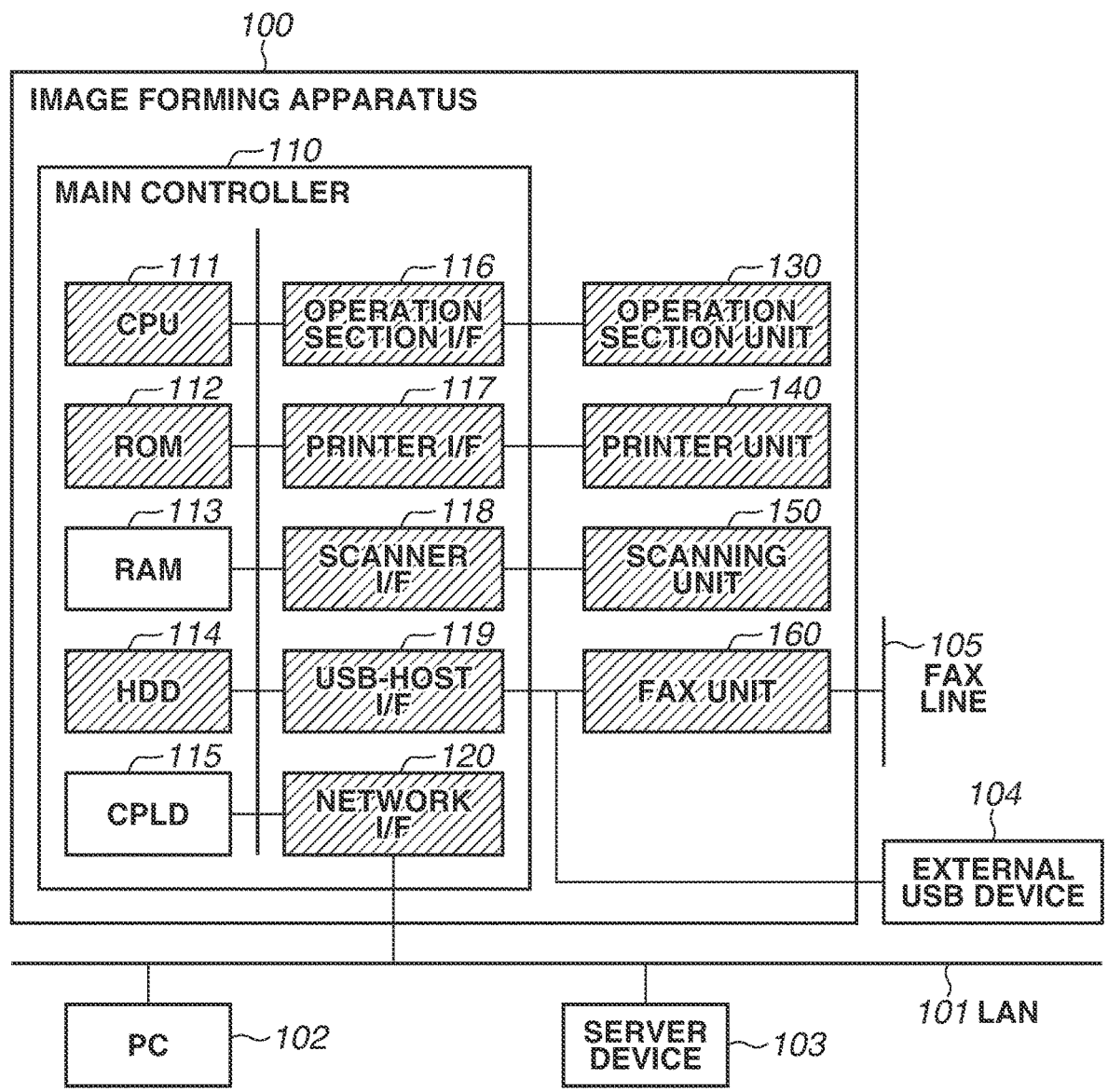
FIG. 2B is a diagram illustrating the image forming apparatus in a suspended mode.

The CPLD 115 controls supplying and stopping power to the respective units of the image forming apparatus 100 based on information indicating a power mode notified by the CPU 111. In the normal power mode, power is supplied to the respective units of the image forming apparatus 100. When the sleep mode is notified by the CPU 111, the CPLD 115 stops power supply to the CPU 111, the ROM 112, the HDD 114, the printer I/F 117, the scanner I/F 118, the printer unit 140, and the scanning unit 150, as illustrated in FIG. 2A. When the suspended mode is notified by the CPU 111, the CPLD 115 stops power supply to the respective units of the image forming apparatus 100 other than the RAM 113 and itself, i.e., the CPLD 115, as illustrated in FIG. 2B. In the suspended mode, power supply to the RAM 113 is not stopped, and thus the RAM 113 can retain data. The RAM 113 may be a dynamic RAM (DRAM) which shifts to a self-refresh mode in the suspended mode. When the power-off mode is notified by the CPU 111, the CPLD 115 stops power supply to all the units, as illustrated in FIG. 2C. Even in the power-off mode, power is supplied to a portion that detects an operation of the power switch.

The CPU 111 executes sleep shifting processing if it is determined that a condition for shifting to the sleep mode is satisfied. Then, the CPU 111 notifies the CPLD 115 of the sleep mode. The image forming apparatus 100 according to the present embodiment shifts to the sleep mode on condition, as the condition for shifting to the sleep mode, that the image forming apparatus 100 does not receive predetermined access from the PC 102 or the server device 103 and the operation section unit 130 does not receive a user operation for a predetermined length of time. The image forming apparatus 100 also shifts to the sleep mode in a case where a power saving button (not illustrated) disposed on the operation section unit 130 is pressed.

In the present embodiment, the image forming apparatus 100 shifts to the suspended mode or the power-off mode based on a power-off instruction. Examples of the power-off instruction include an operation for turning off the power switch, a remote-off instruction from an external device, an off instruction issued by a timer at a specified time, and an off instruction issued by the timer after elapse of a predetermined time. Specifically, whether the image forming apparatus 100 shifts to the suspended mode or the power-off mode upon reception of the power-off instruction is set in advance (see FIG. 4), and the image forming apparatus 100 shifts to the preset mode (the suspended mode or the power-off mode) based on the power-off instruction. A determination of whether the image forming apparatus 100 shifts to the suspended mode or the power-off mode can be set based on an operation time of the power switch. For example, in a case where the power switch is pressed and held for a long time, the image forming apparatus 100 shifts to the power-off mode. In a case where the power switch is pressed and held for a short time, the image forming apparatus 100 shifts to the suspended mode.

In a case where the power switch is turned on in the suspended mode, the image forming apparatus 100 is activated into the normal power mode. In a case where the power switch is turned on in the power-off mode, the image forming apparatus 100 is activated into the normal power mode. A time for activation from the suspended mode to the normal power mode is shorter than a time for activation from the power-off mode to the normal power mode. The time for activation from the suspended mode to the normal power mode is shorter, but power consumption in the suspended mode is higher than power consumption in the power-off mode. In addition, shut-down processing (including application end processing and operating system end processing)

is executed before shifting to the power-off mode. The shut-down processing is not executed at shifting to the suspended mode.

FIG. 3 is a diagram illustrating various programs stored in the ROM 112. The programs stored in the ROM 112 are executed by the CPU 111 of the main controller 110.

An operation section control program 311 controls the operation section unit 130 via the operation section I/F 116. A printer control program 312 controls the printer unit 140 via the printer I/F 117. A scanner control program 313 controls the scanning unit 150 via the scanner I/F 118.

A USB control program 314 controls the USB device via the USB-Host I/F 119. The USB control program 314 processes data transmitted from the external USB device 104. A file transmitted from the external USB device 104 is saved in the HDD 114.

A power control program 315 communicates with the CPLD 115 and the respective units to control power of the respective units of the image forming apparatus 100. The power control program 315 determines whether the condition for shifting to the sleep mode is satisfied. If the power control program 315 determines that the condition for shifting to the sleep mode is satisfied, the power control program 315 notifies the CPLD 115 of the sleep mode. Further, the power control program 315 determines whether a condition for shifting to the suspended mode is satisfied. If the power control program 315 determines that the condition for shifting to the suspended mode is satisfied, the power control program 315 notifies the CPLD 115 of the suspended mode. Further, the power control program 315 determines whether a condition for shifting to the power-off mode is satisfied. If the power control program 315 determines that the condition for shifting to the power-off mode is satisfied, the power control program 315 notifies the CPLD 115 of the power-off mode.

A boot program (boot loader) 316 is a program for activating the operating system. Correct value data 317 is data to be used for determining presence/absence of software tampering. The correct value data 317 is updated when the software is updated.

The tampering detection program 318 calculates a calculation value (for example, hash value) of target software when the image forming apparatus 100 is activated to determine whether the calculation value matches the correct value data 317. In the present embodiment, the tampering detection program 318 detects tampering with the boot program 316 and the operating system. Therefore, the correct value data 317 includes a correct value to be compared with the calculation value of the boot program 316, and a correct value to be compared with the calculation value of the operating system. If the calculation value does not match the correct value, target software is determined to be tampered, and error information is displayed on a display unit of the operation section unit 130 via the operation section I/F 116.

Figure 4:
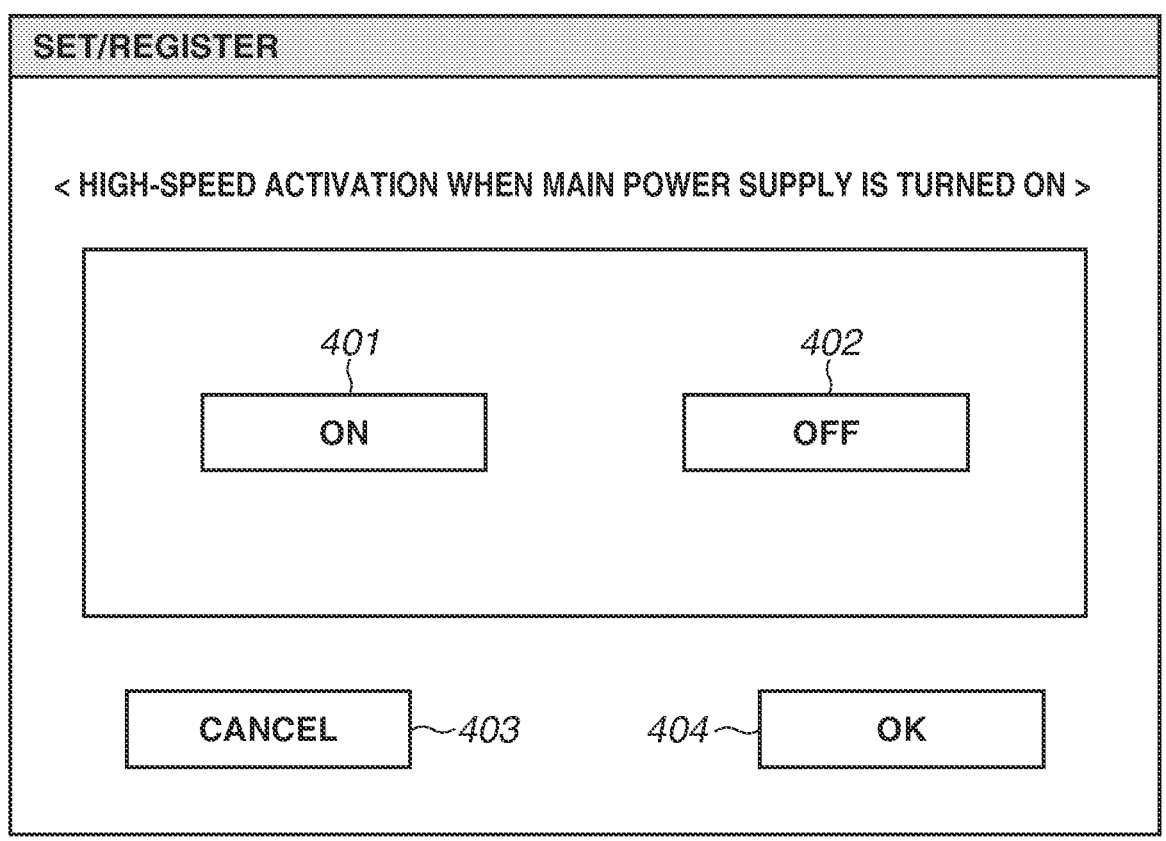

FIG. 4 illustrates a screen for setting whether high-speed activation is to be performed at a time when a main power supply is ON.

The screen illustrated in FIG. 4 indicates a message "HIGH-SPEED ACTIVATION WHEN MAIN POWER SUPPLY IS TURNED ON". On the screen illustrated in FIG. 4, a setting can be made whether to perform the high-speed activation when the main power supply (namely, power switch) is turned on. On the screen illustrated in FIG. 4, when an ON button 401 is selected, the image forming apparatus 100 shifts to the suspended mode if the power switch is turned off. On the other hand, on the screen illustrated in FIG. 4, when an OFF button 402 is selected, the image forming apparatus 100 shifts to the power-off mode if the power switch is turned off. The activation time from the suspended mode to the normal power mode is shorter than the activation time from the power-off mode to the normal power mode. Thus, the activation from the suspended mode is the high-speed activation. In other words, the screen illustrated in FIG. 4 is used for a setting of whether the image forming apparatus 100 shifts to the suspended mode or the power-off mode when the power switch is turned off.

When the ON button 401 or the OFF button 402 is selected and then an OK button 404 is selected, the setting of whether the high-speed activation is performed is set. In a case where a cancel button 403 is selected, a setting change is cancelled.

Figure 5:
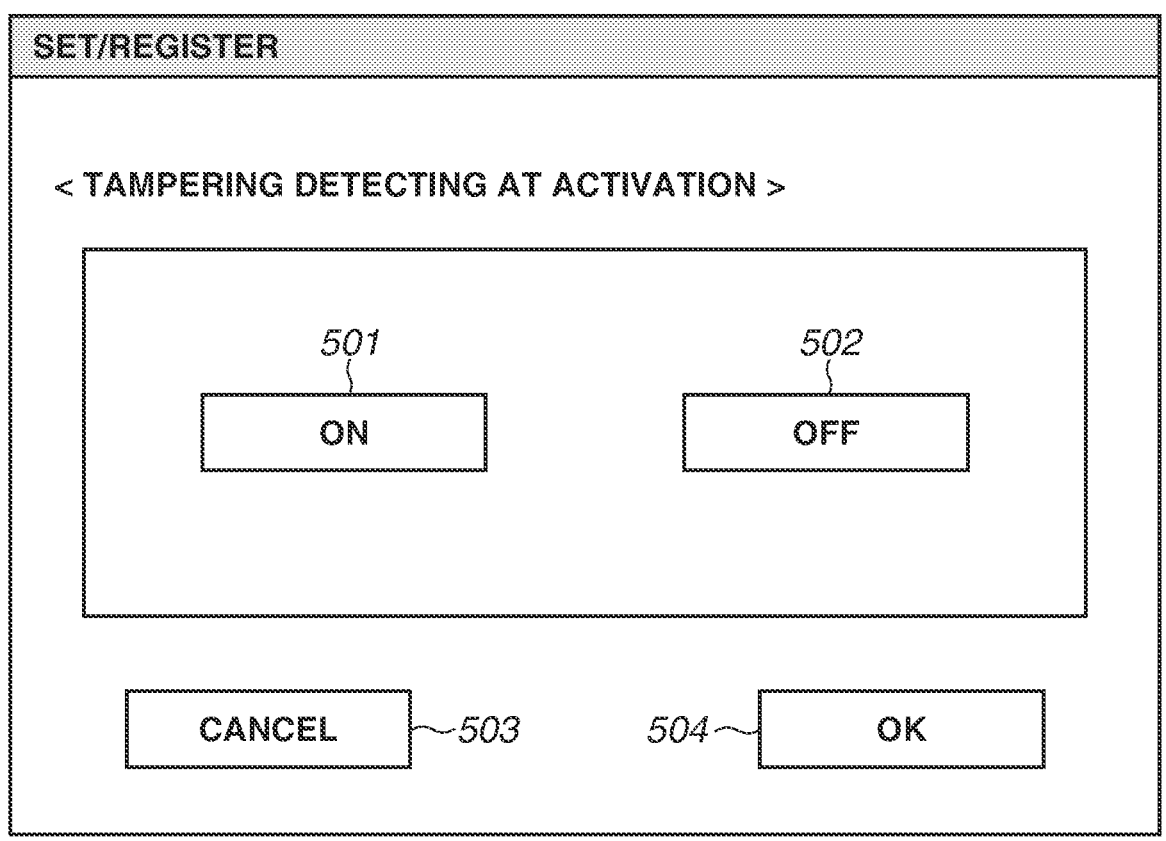
FIG. 5 is a diagram illustrating a screen for setting whether software tampering detection is performed at activation.

FIG. 5 illustrates a screen for setting whether software tampering detection is performed at activation.

The screen illustrated in FIG. 5 indicates a message "TAMPERING DETECTION AT ACTIVATION". On the screen illustrated in FIG. 5, a setting of whether software tampering detection is performed for target software at the activation from the power-off mode can be set. On the screen illustrated in FIG. 5, when an ON button 501 is selected, software tampering detection is performed for the target software at the activation from the power-off mode. Meanwhile, on the screen illustrated in FIG. 5, when an OFF button 502 is selected, activation processing, such as execution of the target software, is executed at the activation from the power-off mode without software tampering detection of the target software. The ON button 501 or the OFF button 502 is selected and then an OK button 504 is selected, whereby the setting of whether software tampering detection is performed for the target software can be set. In a case where a cancel button 503 is selected, a setting change is canceled.

The processing for detecting tampering with target software by the tampering detection program 318 can secure safety in viewpoint of security. However, an activation time may become longer depending on a target software size. More specifically, a time from when the power switch is turned on until when the image forming apparatus 100 can be used may become longer. For this reason, the setting of whether software tampering detection is performed can be set based on a use environment and the needs of a user.

Figure 6:
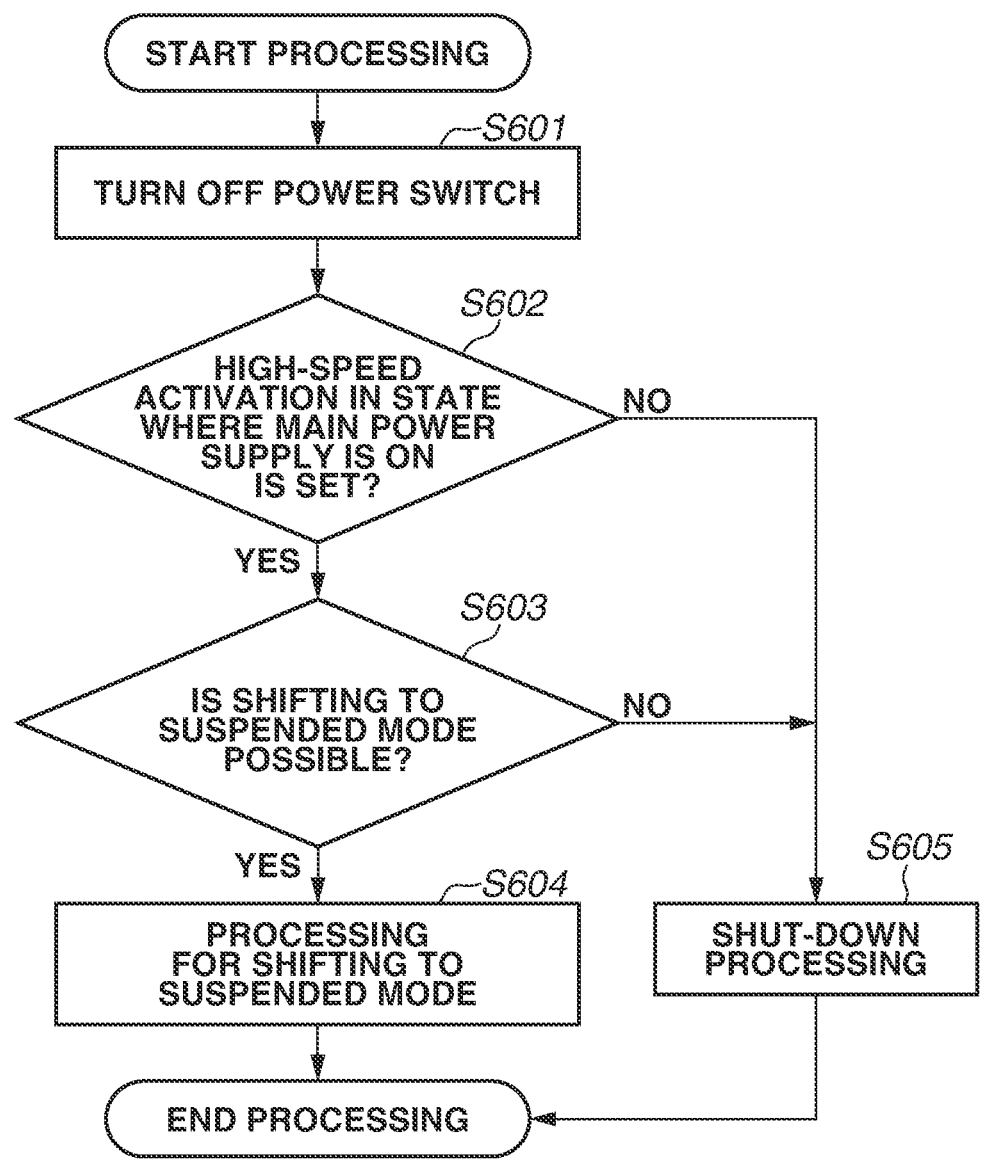
FIG. 6 is a flowchart illustrating processing procedure to be executed when a power switch is turned off.

FIG. 6 is a flowchart of the processing procedure that is executed when the power switch is turned off. Each procedure in the flowchart of FIG. 6 is executed by the CPU 111 executing the programs stored in the ROM 112.

In step S601, in response to turning off of the power switch by a user operation, the CPU 111 receives a signal representing an off mode of the power switch from the CPLD 115. The CPLD 115 can detect that the power switch is turned off. When detecting that the power switch is turned off, the CPLD 115 transmits a signal representing that the power switch is off to the CPU 111. The power switch may be a switch which remains in an on state or an off state like a seesaw switch (rocker switch), or a switch which does not remain in an on state and an off state like a tact switch.

In step S602, the CPU 111 then determines whether the high-speed activation at the time when the main power supply is turned on has been set to ON. The CPU 11 determines whether the high-speed activation at the time when the main power supply is turned on has been set to ON on the screen illustrated in FIG. 4. In a case where the high-speed activation has been set to OFF (NO in step S602), the processing proceeds to step S605. In step S605, the CPU 111 executes shut-down processing of the image forming apparatus 100.

In a case where the high-speed activation has been set to ON (YES in step S602), the processing proceeds to step S603. In step S603, the CPU 111 determines whether the image forming apparatus 100 can shift to the suspended mode. Specifically, the CPU 111 determines a job execution status, whether a setting to be inconsistent in the suspended mode is set, whether the shut-down processing has to be executed, and whether a long time elapses without execution of the shut-down processing. If a predetermined condition is not satisfied for shifting to the suspended mode in step S603 (NO in step S603) even in the case where the high-speed activation when the main power supply is turned on has been set to ON, the shut-down processing is executed in step S605. After the shut-down processing, the image forming apparatus 100 shifts to the power-off mode.

If the predetermined condition for shifting to the suspended mode is satisfied (YES in step S603), processing for shifting to the suspended mode is executed in step S604. After the processing for shifting to the suspended mode, the image forming apparatus 100 is in the suspended mode. In the suspended mode, the data in the RAM 113 is held. The image forming apparatus 100 may shift to a hibernation mode instead of the suspended mode.

Figure 7:
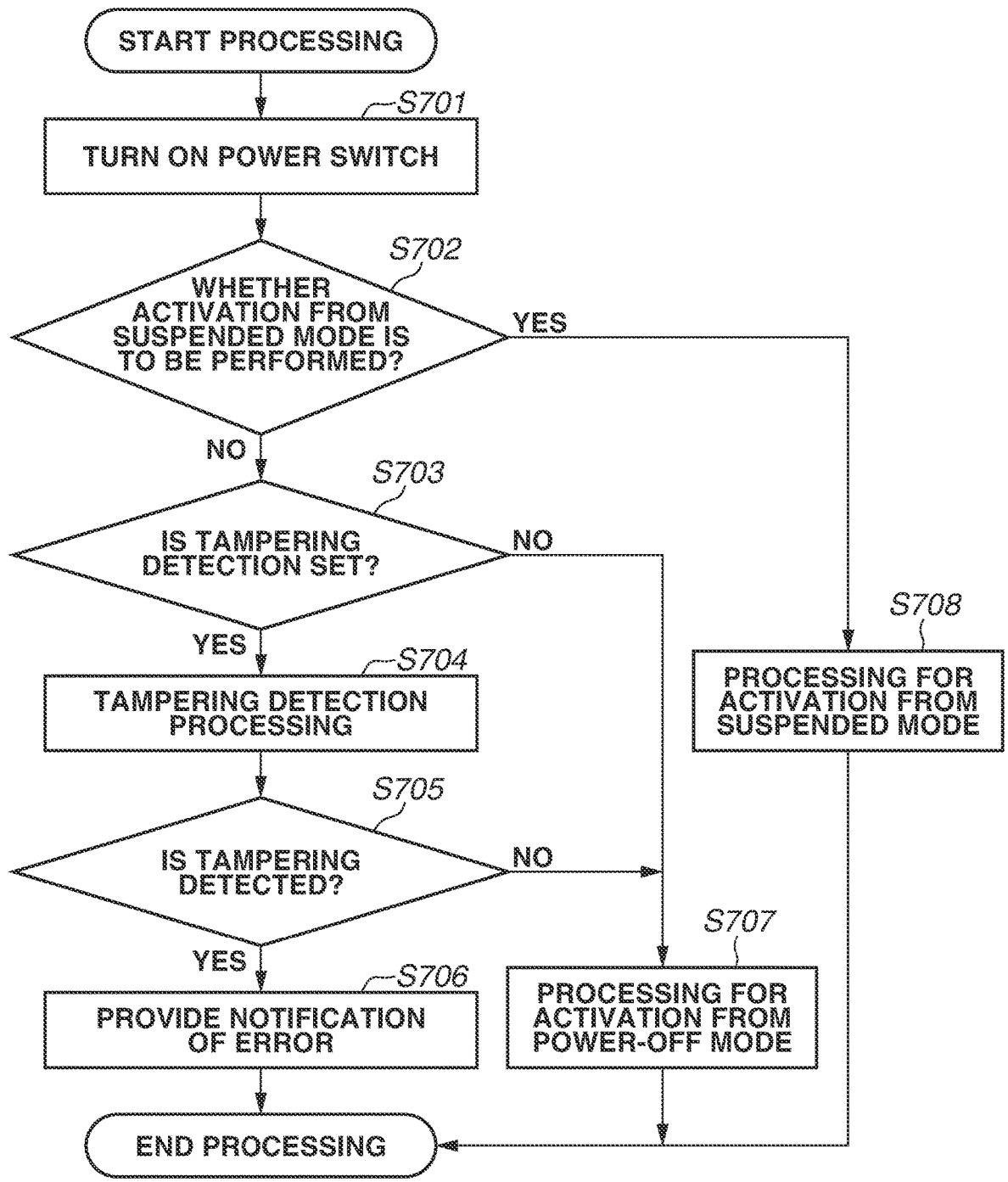

FIG. 7 is a flowchart of the processing procedure that is executed when the power switch is turned on. Each procedure in the flowchart of FIG. 7 is executed by the CPU 111 executing the programs stored in the ROM 112.

In step S701, in response to turning on of the power switch, power is supplied to the CPU 111. The CPU 111 then receives a signal representing that the power switch is ON from the CPLD 115. The CPLD 115 can detect that the power switch is turned on. If the CPLD 115 detects that the power switch is turned on, the CPLD 115 transmits a signal representing that the power switch is ON to the CPU 111.

In step S702, the CPU 111 determines whether the activation from the suspended mode is to be performed. In a case where the CPU determines that the activation from the suspended mode is performed (YES in step S702), the processing proceeds to step S708. In step S708, the CPU 111 executes processing for activation to the normal power mode without performing the software tampering detection processing of the target software.

In a case where the CPU 111 determines that activation from the suspended mode is not performed, more specifically, activation from the power-off mode is performed (NO in step S702), the processing proceeds to step S703. In step S703, the CPU 111 determines whether the setting for software tampering detection has been set to ON on the screen illustrated in FIG. 5. In a case where the setting for software tampering detection has been set to OFF (NO in step S703), the processing proceeds to step S707. In step S707, the CPU 111 executes the processing for activating the image forming apparatus 100 without performing the software tampering detection processing of the target software. The activation processing in step S708 is different from the activation processing in step S707 in that the activation processing is executed while programs that are stored in the ROM 112 and are to be used for the activation are being sequentially read out. In a case where the setting for software tampering detection has been set to ON (YES in step S703), the processing proceeds to step S704.

In step S704, the CPU 111 executes the software tampering detection processing of the target software (the boot program and the operating system). In step S705, the CPU determines whether tampering with the target software is detected. Specifically, the CPU 111 executes the tampering detection program 318, and compares a hash value of the boot program with the correct value data 317. If the hash value of the boot program matches the correct value data 317, the CPU 111 then compares a hash value of the operating system with the correct value data 317.

In a case where the hash value of the boot program does not match the correct value data 317, the CPU 111 determines that tampering with the target software is detected (YES in step S705), and the processing proceeds to step S706. Further, in a case where the hash value of the operating system does not match the correct value data 317, the CPU 111 also determines that tampering with the target software is detected (YES in step S705), and the processing proceeds to step S706. In step S706, the detection of tampering with the target software is displayed on the display unit of the operation section unit 130 via the operation section I/F 116. The display unit may display an error code representing software tampering or a message describing that the target software is tampered. As an alternative to displaying on the display unit for notification of software tampering, software tampering may be notified by light emission using a light-emitting diode (LED) or by a sound.

In a case where the hash value of the boot program matches the correct value data 317 and the hash value of the operating system matches the correct value data 317, the CPU 111 determines that tampering with the target software is not detected (NO in step S705), the processing proceeds to step S707.

Even if the function for software tampering detection is enabled, the processing for software tampering detection is omitted at activation from the suspended mode for a user who desires high-speed activation. Therefore, a time during which the user waits for activation of the image forming apparatus 100 is shortened.

As a second embodiment, description will be given of a case where a setting of the software tampering detection at high-speed activation is set in addition to the setting of the software tampering detection at activation as illustrated in FIG. 5.

According to the first embodiment, software tampering detection is not performed for the target software at activation from the suspended mode. However, in some cases, software tampering detection is desired to be performed also at activation from the suspended mode. Therefore, according to the second embodiment, a user sets whether software tampering detection is performed at activation from the suspended mode.

Figure 8:
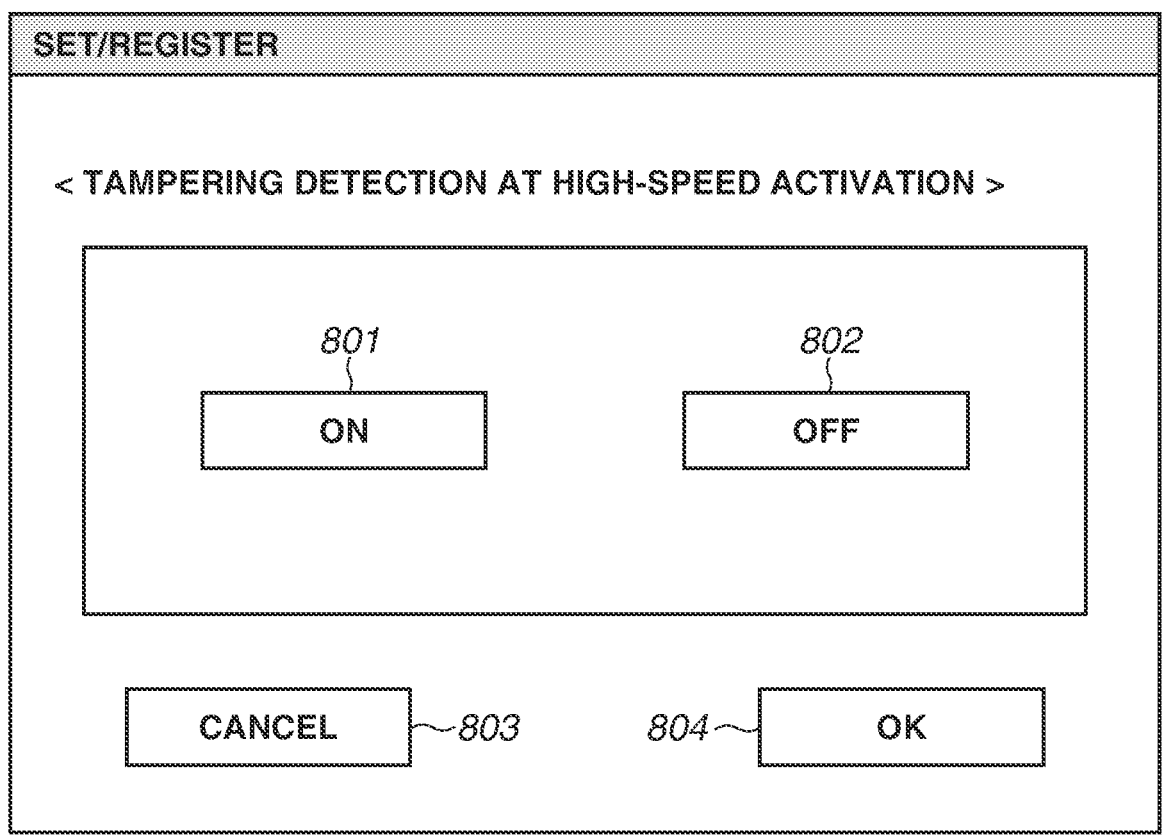
FIG. 8 is a diagram illustrating a screen for setting whether the software tampering detection is performed at activation from the suspended mode.

FIG. 8 is a screen for setting whether software tampering detection is performed at activation from the suspended mode. The screen illustrated in FIG. 8 indicates a message "TAMPERING DETECTION AT HIGH-SPEED ACTIVATION". On the screen illustrated in FIG. 8, a setting of whether software tampering detection is performed for target software at activation from the suspended mode can be set. On the screen illustrated in FIG. 8, when an ON button 801 is selected, software tampering detection for target software is performed at activation from the suspended mode. Meanwhile, on the screen illustrated in FIG. 8, when an OFF button 802 is selected, the target software is executed without performing software tampering detection for the target software at activation from the suspended mode. The setting of whether software tampering detection is performed for the target software can be set by selecting the ON button 801 or the OFF button 802 and then selecting an OK button 804. In a case where a cancel button 803 is selected, a setting change is canceled.

With the setting on the screen illustrated in FIG. 8 in addition to the setting on the screen illustrated in FIG. 5, the setting of whether software tampering detection is performed at activation from the suspended mode can be set. The setting of whether software tampering detection is performed at activation from the power-off mode can also be set.

Figure 9:
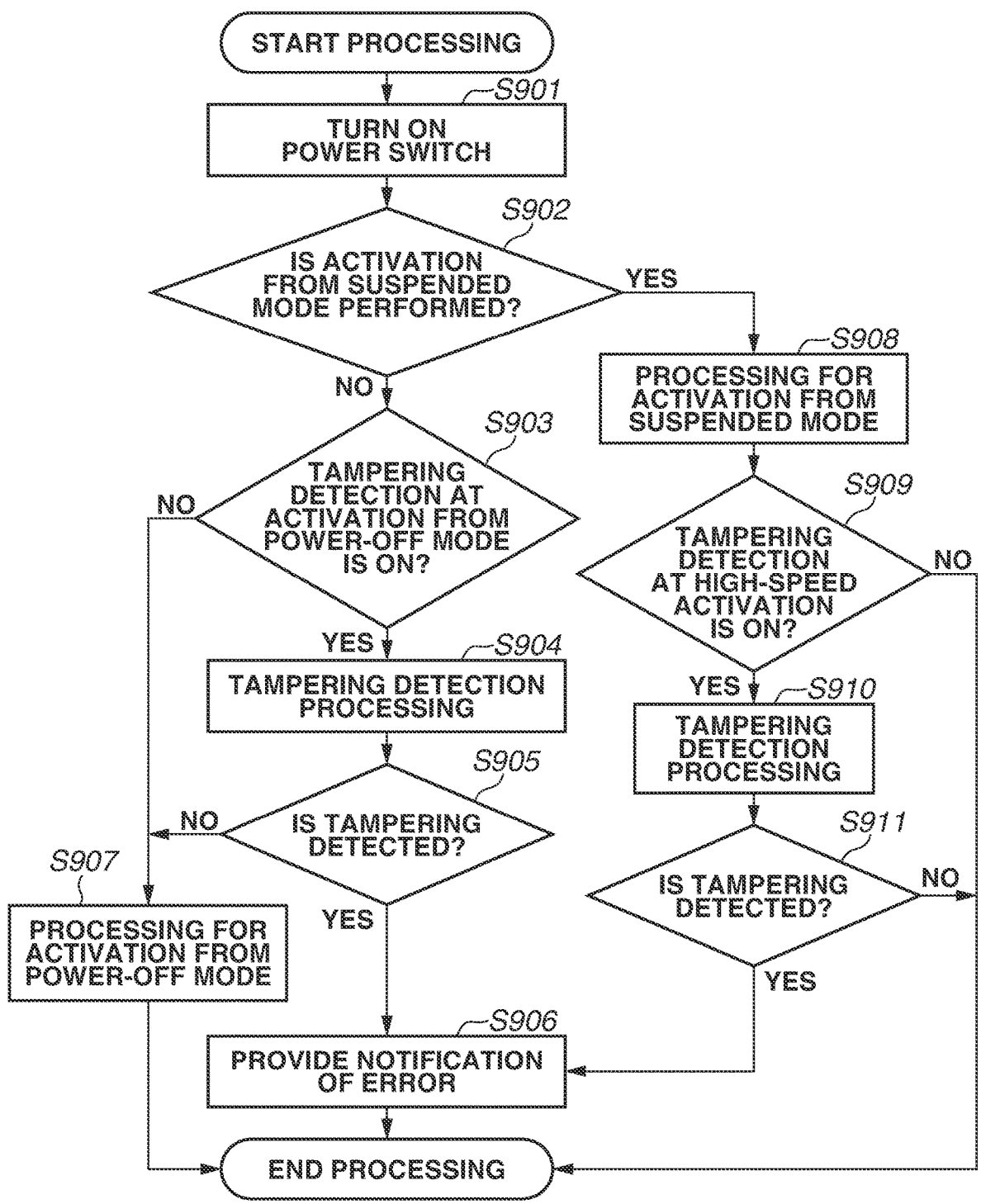

FIG. 9 is a flowchart of the processing procedure that is executed when the power switch is turned on. Each procedure in the flowchart illustrated in FIG. 9 is executed by the CPU 111 executing the programs stored in the ROM 112.

The steps S901 to S908 are similar to the steps S701 to S708 illustrated in FIG. 7, and thus description thereof is omitted.

After activation processing in step S908, in step S909, the CPU 111 determines whether the software tampering detection has been set to ON on the screen illustrated in FIG. 8. In a case where software tampering detection has been set to OFF (NO in step S909), the processing in the flowchart is ended without performing software tampering detection of the target software. In a case where software tampering detection has been set to ON (YES in step S909), the processing proceeds to step S910.

In step S910, the CPU 111 executes the processing for software tampering detection of the target software (the boot program and the operating system). Specifically, the CPU 111 executes the tampering detection program 318, and compares a hash value of the boot program with the correct value data 317. If the hash value of the boot program matches the correct value data 317, the CPU 111 then compares a hash value of the operating system with the correct value data 317.

In step S911, in a case where the hash value of the boot program does not match the correct value data 317, the CPU 111 determines that tampering with the target software is detected (YES in step S911), and the processing proceeds to step S906. Further, in a case where the hash value of the operating system does not match the correct value data 317, the CPU 111 also determines that tampering with the target software is detected (YES in step S911), and the processing proceeds to step S906. In step S906, the detection of tampering with the target software is displayed on the display unit of the operation section unit 130 via the operation section I/F 116. The display unit may display an error code representing software tampering or a message describing that the target software is tampered. As an alternative to displaying on the display unit for notification of software tampering, software tampering may be notified by light emission using a light-emitting diode (LED) or by a sound.

In a case where the hash value of the boot program matches the correct value data 317 and the hash value of the operating system matches the correct value data 317, the CPU 111 determines that tampering with the target software is not detected (NO in step S911), the flowchart is ended.

Software tampering detection can be performed even at activation from the suspended mode by executing the processing procedure of the flowchart illustrated in FIG. 9. Accordingly, the activation processing placing importance on security can be executed.

In the above-described embodiments, the image forming apparatus 100 has been described as an example of an electronic apparatus of the present invention. However, the electronic apparatus of the present invention is not limited to the image forming apparatus. The electronic apparatus of the present invention is applicable to various electronic apparatuses, such as a notebook PC, a tablet PC, a desktop PC, a smartphone, an automobile, an air conditioner, a game machine, and a robot.

In the above embodiments, in a case where high-speed activation at the time when the main power supply is ON is set to ON, the setting may be changed so that software tampering detection is not performed. Further, in the case where software tampering detection is set, high-speed activation at the time when the main power supply is ON may be set to OFF.

According to the embodiments of the present invention, the processing for software tampering detection can be omitted without a predetermined user operation at activation from the standby mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-044282, filed Mar. 11, 2019, which is hereby incorporated by reference herein in its entirety.

What is claimed is:

1. An electronic apparatus that is configured to communicate with an external device and to detect tampering with predetermined software, the electronic apparatus comprising:
    a shifting unit configured to cause the electronic apparatus to shift to one of a first off mode in which electric power supply to a predetermined device is stopped and communication with the external device is disabled and a second off mode in which electric power supply to the predetermined device is performed and communication with the external device is disabled, based on a power-off instruction; and a detection unit configured to perform detection of tampering with the predetermined software at activation of the electronic apparatus from the first off mode, wherein the detection unit does not perform detection of tampering with the predetermined software at activation of the electronic apparatus from the second off mode.

2. The electronic apparatus according to claim 1, further comprising:

a setting unit configured to set a state that shifting of the electronic apparatus is to be performed based on the power-off instruction, wherein the shifting unit causes the electronic apparatus to shift to the first off mode or the second off mode, based on a setting set by the setting unit.

3. The electronic apparatus according to claim 1, wherein the shifting unit is configured to cause the electronic apparatus to shift to the first off mode or the second off mode, based on an operation time of an electric power switch.

4. The electronic apparatus according to claim 1, wherein the detection unit is configured to perform detection of tampering with the predetermined software, based on at least correction value data and a hash value of the predetermined software that are stored in advance.

5. The electronic apparatus according to claim 1, further comprising:

a setting unit configured to set whether detection of tampering with the predetermined software at activation of the electronic apparatus is performed, wherein, based on a setting set by the setting unit, the detection unit is configured to perform detection of tampering with the predetermined software at activation from the first off mode or not to perform detection of tampering with the predetermined software at activation from the first off mode.

6. The electronic apparatus according to claim 5, wherein the detection unit is configured to not perform detection of tampering with the predetermined software at activation from the second off mode even in a case where the setting unit has set that detection of tampering with the predetermined software at activation is performed.

7. The electronic apparatus according to claim 1, further comprising a notification unit configured to provide a notification of an error in a case where the detection unit detects tampering with the predetermined software.

8. The electronic apparatus according to claim 1, wherein the first off mode corresponds to an advanced configuration and power interface (ACPI) S5 state, and the second off mode corresponds to an ACPI S3 state or an ACPI S4 state.

9. The electronic apparatus according to claim 1, wherein the predetermined software includes at least one of a boot program and an operating system.

10. The electronic apparatus according to claim 1, further comprising a printing unit configured to print an image on a recording medium.

11. The electronic apparatus according to claim 1, further comprising a reading unit configured to read an image on a document.

12. A control method of an electronic apparatus that is configured to communicate with an external device and to detect tampering with predetermined software, the control method comprising:

shifting the electronic apparatus to one of a first off mode in which electric power supply to a predetermined device is stopped and communication with the external device is disabled and a second off mode in which electric power supply to the predetermined device is performed and communication with the external device is disabled, based on a power-off instruction; and performing detection of tampering with the predetermined software at activation of the electronic apparatus from the first off mode, wherein detection of tampering with the predetermined software is not performed at activation of the electronic apparatus from the second off mode.

* * * * *